United States Patent [19]
Frisch et al.

[11] 3,853,699
[45] Dec. 10, 1974

[54] NUCLEAR REACTOR HAVING CONTROL-ROD RETAINING MEANS

[75] Inventors: Erling Frisch, Pittsburgh; Harry N. Andrews, Export, both of Pa.

[73] Assignee: Westinghouse Electric Corporation, Pittsburgh, Pa.

[22] Filed: Sept. 13, 1971

[21] Appl. No.: 180,050

Related U.S. Application Data
[63] Continuation-in-part of Ser. No. 53,201, July 8, 1970.

[52] U.S. Cl. ............... 176/36 R, 176/25, 294/88
[51] Int. Cl. ......................... G21c 7/12, G21c 7/18
[58] Field of Search ......... 176/25, 36 R, 30, 31, 32; 294/88; 310/14

[56] References Cited
UNITED STATES PATENTS

| | | | |
|---|---|---|---|
| 3,050,943 | 8/1962 | Thorel et al. | 176/36 R |
| 3,132,290 | 5/1964 | Kumpf | 310/14 |
| 3,158,766 | 11/1964 | Frisch | 310/14 |
| 3,260,870 | 7/1966 | Beach, Jr. et al. | 310/14 |
| 3,607,629 | 9/1971 | Frisch et al. | 176/36 R |

*Primary Examiner*—Benjamin R. Padgett
*Assistant Examiner*—Roger S. Gaither
*Attorney, Agent, or Firm*—J. R. Campbell

[57] ABSTRACT

A nuclear reactor has control rods which may be operated between control positions and retracted positions by linearly-movable elements or drive means. In the retracted position, a control rod or a group of control rods may be retained by latches, the lower tips of which enter a groove in a linearly-movable element or drive means. The latches are movable between a released position and a restraining position. The latches are made of magnetic steel and are maintained in the restraining position by permanent magnet means which are operable between a coupled magnetic position wherein the drive means is maintained in the restraining condition and a decoupled position wherein the latches may release the associated drive means. Such operation of the magnet is in response to movement of a missile shield associated with the nuclear reactor.

10 Claims, 10 Drawing Figures

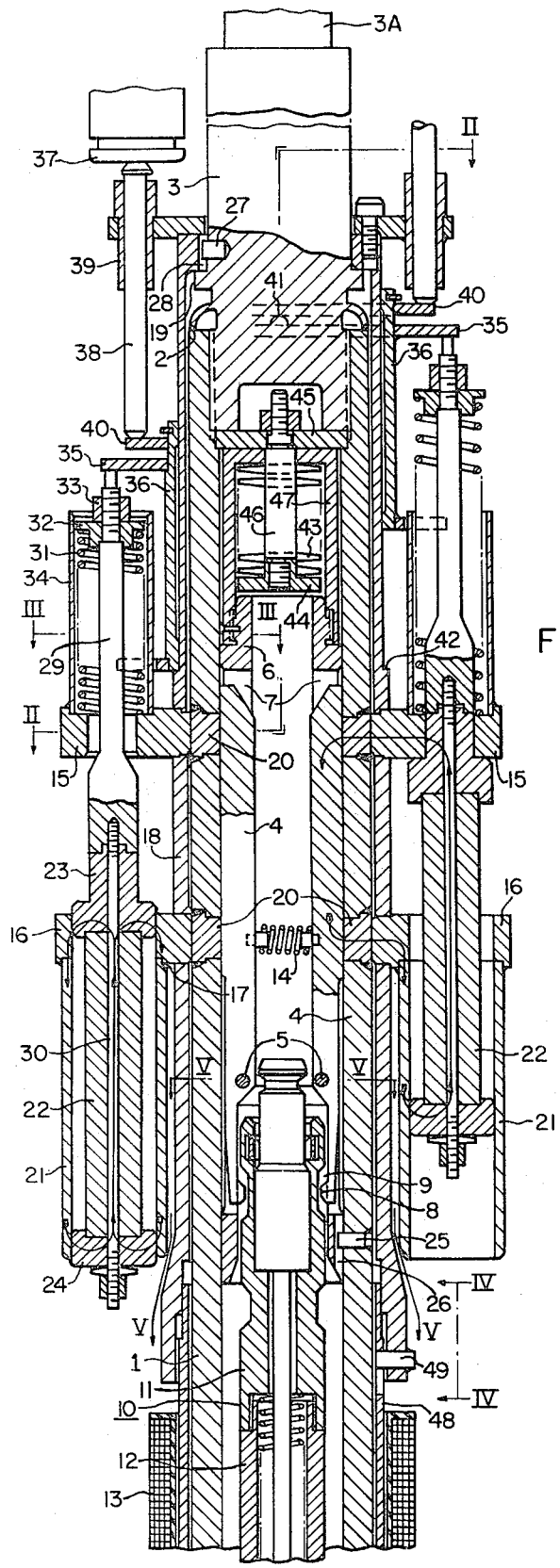
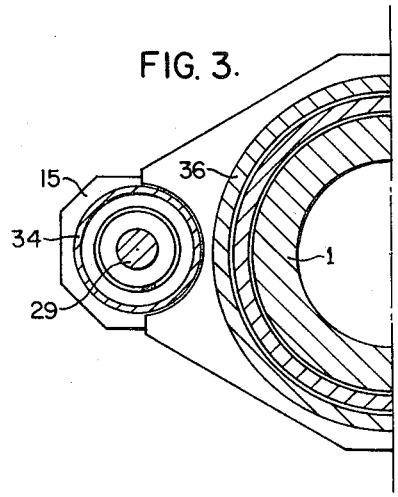
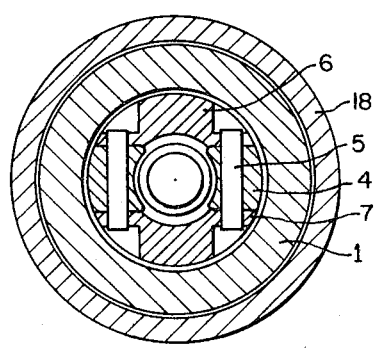
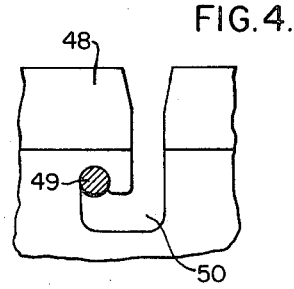

NUCLEAR REACTOR HAVING CONTROL-ROD RETAINING MEANS

CROSS REFERENCES TO RELATED APPLICATIONS

This application is a continuation-in-part of our U.S. copending patent application, Ser. No. 53,201, filed July 8, 1970, entitled "Rapidly Refuelable Nuclear Reactor."

This application also relates to our U.S. copending patent application filed on July 8, 1970, Ser. No. 53,200 now U.S. Pat. No. 3,752,737 entitled "Combination of Nuclear Reactor and Missile Shield."

This application also is related to our U.S. patent application Ser. No. 53,206, filed July 8, 1970, and entitled "Reactor Refueling Method" which in turn is a continuation-in-part of our U.S. patent application, Ser. No. 700,121, filed Jan. 24, 1968 now U.S. Pat. No. 3,607,629.

BACKGROUND OF THE INVENTION

Nuclear reactors include nuclear fuel assemblies penetrated longitudinally by movable control rods which control the neutron flux through the fuel. For convenience a nuclear reactor may be regarded as an elongated generally cylindrical structure with its axis and that of the multi fuel assembly core and the control rods vertically disposed.

In one approach the control rods consist of a core of neutron absorber material, which may be a silver-indium-cadmium alloy, hermetically sealed in thin-walled stainless steel tubes of approximately the same diameter as the fuel rods. Several control rods are movably supported in a fuel assembly by thin-walled guide tubes interspersed between the fuel rods. The control rods, associated with one fuel assembly, are attached through a spider arrangement to a common drive means and are positioned in the fuel assembly by a gripper type linear motion device as disclosed in U.S. Pat. No. 3,158,766.

Another form of drive mechanism is disclosed in U.S. Pat. No. 3,445,689.

In the above-mentioned U.S. patent application Ser. No. 700,121 hydraulic drive mechanisms are provided for moving the control rods.

During rapid refueling all control rods are retracted out of the core and stored in the upper internals of the reactor during the time when the upper package of the reactor is removed for refueling. The upper package includes the upper internals, the closure head, the control rod units and the drive mechanisms. It is essential that the control rod holding means does not fail during this time since the release of a control rod assembly would cause extensive damage to the equipment and substantially increase the refueling time. Energizing of the drive mechanism holding coils during the refueling period alone does not meet this rigid requirement since the possibility exists that the coils may become accidentally deenergized thereby releasing the corresponding control rod assembly.

It is an object of this invention to provide for reliably holding the control rods in the retracted position during refueling.

SUMMARY OF THE INVENTION

In order to refuel the reactor quickly, it is necessary to ensure that linearly-movable elements such as the normally incrementally movable control rods are moved by their associated drive mechanism to their retracted position which in accordance with this invention is effected by permanent-magnet holding means which operates through latches to hold the control rods retracted. The invention is particularly suitable for, and will be described as applied to, a nuclear reactor. The nuclear reactor has a missile shield which restrains or intercepts the control rod drive housings in the event of a major break and prevents the penetration by this housing of the dome of the vapor container. The missile shield also prevents damage to the control rod mechanisms during a seismic disturbance. In a preferred embodiment of this invention the missile shield is vertically movable to an upper position preparatory to refueling of the reactor. In accordance with this invention this movement of the missile shield causes the permanent-magnet holding means to move into a coupled magnetic position which forces the latches to maintain the drive means and the associated control rods in the retracted position which is maintained during the refueling period. After the refueling is completed the missile shield is displaced downwardly to its normal position. This moves the holding permanent magnet means to a decoupled position which permits release of the control rods.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 1 is a view in cross section of the latching mechanism which forms the upper extension of the gripper type linear motion device (U.S. Pat. No. 3,158,766);

FIG. 3 is a view in section taken on the line III—III of FIG. 1;

FIG. 4 is a detail view in side elevation with parts broken away of a bayonet joint employed in the mechanism of FIG. 1;

FIG. 5 is a view in section taken on the line V—V of FIG. 1;

DETAILED DESCRIPTION OF THE INVENTION

Figure 2:
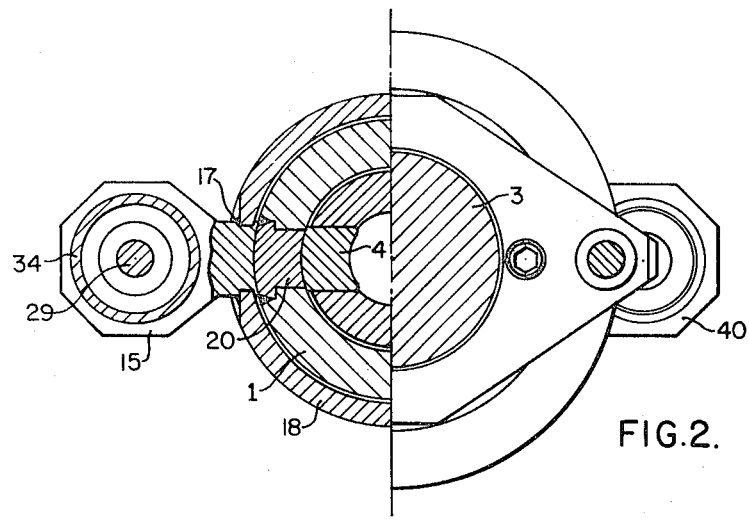
FIG. 2 is a view in section taken on the line II—II of FIG. 1.

A latching mechanism embodying the invention will now be described. Thereafter the application of the latching mechanism to a nuclear reactor will be considered. The invention is particularly suitable for such an application.

Referring to FIG. 1, a vertically-extending tubular non-magnetic steel travel housing 1 of a gripper type linear motion device is shown for receiving a linearly-movable element or control rod drive shaft 10. As will be explained below, this drive shaft desirably may be moved vertically between first and second positions for positioning control rods in a nuclear reactor.

The latching mechanism is mounted on an extension of the travel housing 1 which is hermetically sealed at the upper end by canopy welding 2 of a threaded plug 3. The plug 3 has a reduced-diameter tip 3A which is employed for lateral support as noted below. Two latches 4 made of magnetic steel, are located in longitudinal slots 7 of a bushing 6, slidably mounted in the travel housing, and are attached to the bushing by fulcrum pins 5 as best illustrated in FIG. 5. The latches are mounted for pivotal movement between first and second orientations. The lower inwardly pointed tips 8 of the latches in the first or holding orientation extend into a wide circular groove 9 near the upper end of the mechanism drive shaft 10 and will capture and hold the drive shaft when the latches are held magnetically in position as shown, as will be described later.

The mechanism drive shaft has an upper part 11 made of non-magnetic steel. The remainder of the drive shaft 12 is made of magnetic steel. This is desirable to obtain position indication through a series of coils 13 until the shaft reaches its upper travel-limit. This method of position indication is well known to the art and is not further described.

A spring 14 is provided to hold the upper ends of the latches 4 in first orientations against the inside of the travel housing. This is done to avoid having to move the latches magnetically through large air gaps as otherwise would be the case. The spring force, however, is sufficiently light to permit free movement of the latches during passage of the upper tip of the drive shaft past the latch tips 8 when the system is not set for locking.

The magnetic structure, required to produce the required high forces on the latches to insure positive locking of the drive shaft, consists of two upper magnetic pole pieces 15 and two magnetic lower pole pieces 16 which are attached by welds 17 to a non-magnetic support tubing 18 enclosing the travel housing 1 and resting on a ledge 19 of the upper closure plug 3. Located in line with the pole pieces are four magnetic steel plugs 20 which penetrate the travel housing and are attached to it by welding. Both the outer and the inner surfaces of the rod travel housing are final machined after the plugs are welded so that there will be a perfect blending of the surfaces. Similarly, after the pole pieces are welded to the support tube, a machining operation is performed on it so that the inner surfaces of the pole pieces will form part of a cylinder with a diameter slightly larger than the outside diameter of the finished travel housing so as to obtain a practical minimum clearance between pole pieces and plugs and thus reduce to a minimum the reluctance of the magnetic circuit. The necessary alignment between the latches and plugs 20 is obtained by an alignment pin 25 secured to the travel housing and a keyway 26 cut in the lower part of the bushing 6. Similarly, alignment between the plugs 20 and pole pieces 15 and 16 is insured by an alignment pin 27 located on the closure plug 3 after the weld 2 is made, and a keyway 28 in the upper shoulder of the support tubing 18.

Attached to the underside of each of the lower pole pieces 16 by welding is a cylindrical tube 21 made of magetic steel which serves as a guide for magnetic-flux-producing means, preferably a cylindrical permanent magnet 22, and also forms a part of the magnetic circuit for the latches 4. Each permanent magnet is movable between an upper situs and a lower situs. Extensions 23 and 24 made of magnetic steel and located at the upper and lower ends of the permanent magnet serve to center it in the guide tube and to maintain a large air gap between the two. The permanent magnet, with its extensions, is attached to an upper actuator rod 29 by means of a stud 30 extending through the center of the magnet. In the unlatched position, as illustrated on the left-hand side of the sketch, the permanent magnet assembly is shunted by the tube 21 and will not exert any magnetic force on the latches which, consequently, are free to swing out of the way and will not hinder any movement of the drive shaft. In the latched position, as illustrated on the right-hand side of the sketch, the permanent magnet is in a position to produce a high magnetic flux through the upper part of the latches in a circuit indicated by arrows. The forces, developed by this flux, must be high enough to hold the combined weight of the drive shaft and the attachments. The transfer of the permanent magnet from the unlatched to the latched position is accomplished by a spring 31 which is captured between the top side of each of the pole pieces 15 and a washer 32 which is secured to the upper end of the actuator rod 29 by a nut 33. A non-magnetic steel tube 34 attached to each of the upper pole pieces 15 by welding, serves as a guide and protection for the actuating spring.

When the permanent magnets are moved to the unlatched positions, the weight of the drive shaft 10 and attachments is adequate to move the latches 4 against their spring bias to their release orientations thus permitting dropping of the drive shaft.

The permanent magnets preferably are of high coercive permanent magnet material capable of developing magnetic forces sufficient to maintain the latch in latching position. The material desirably is Alnico. As a safety factor, the magnetic circuit is preferably designed to produce forces sufficient to hold twice the weight of the drive shaft 10 and the attachments.

The permanent magnets will both be in latching position at the same time or in release or unlatched position at the same time. However, to illustrate the invention simply, the left permanent magnet and associated parts is shown in the unlatched position and the right permanent magnet and associated parts are shown in the latched position.

The upper tips of the two actuator rods 29 contact a flange 35 of a bushing 36 (both shown broken into two parts displaced vertically from each other) which is slidably mounted on the upper machined part of the support tubing 18. The spring forces, exerted on the actuator rods, consequently, tend to move this bushing upward. During normal operating conditions, any upward movement is prevented however, by spring loaded buttons 37 which are designed to permit a certain vertical movement relative to the travel housings, and which, as noted below, may be mounted on the missile shield of a nuclear reactor. During the movement to the lower, normal position the buttons contact two push rods 38, guided in bushings 39 and force them downward. The force is transmitted through a push ring 40 (shown broken into two parts displaced vertically from each other), resting on two diametrically opposite pivot points 41 for force equalization, to the flange 35 and thence to the magnet actuator rods. The movement is terminated when the sliding bushing contacts a shoulder 42 on the support tube 18. Further movement of the buttons 37 preferably is compensated for by compression of springs acting on the buttons but now shown in FIG. 1. When the buttons are lifted, the restraint on the permanent magnet assemblies is removed and the assemblies will be raised by the springs 31 until shoulders on the upper magnet extensions contact the underside of the pole pieces 15.

With the drive shaft 10 in a position as shown on the sketch, it is being held by mechanism grippers which may be similar to those shown in U.S. Pat. No. 3,158,766. If the gripper coils should become deenergized, and cause release of the drive shaft, it will drop a distance of as much as 5/8 inch before it engages the tips 8 of the magnetic latches. To make certain that the forces, developed at the time of impact, do not exceed the design limit of the latch system, it is desirable that an energy absorbing system be provided. For this purpose, the latch bushing 6 is designed to slide on the inside surface of the travel housing. When unloaded, the bushing is forced to the upper position, as illustrated, by a spring assembly, preferably a stack of Belleville springs 43, which is supported between a circular plate 44, attached to a heavy washer 45 by a support rod 46 and the top of an enclosure 47, attached by threading to the sliding bushing. Washer 45 rests on a shoulder of the travel housing and is secured in this position by the bottom end of enclosure plug 3. The spring stack is designed for an initial load, which may be 20 to 30 percent of the combined weight of drive shaft 10 and its attachments, and a final load which should not exceed 200 percent of this weight. Belleville springs were chosen for this service because they can absorb large amounts of energy for a given spring space. At the time of impact, the sliding bushing will be forced downward to compress the spring until the kinetic energy of the drive shaft unit is absorbed.

To permit replacement of the position indicator coils 13, mounted on the coil support tube 48, arrangements are made so that this tube may be disconnected from the magnet support tube 18. This is achieved by a modified bayonet joint, consisting of three pins 49, welded to the lower rim of the magnet support tube, which enter corresponding slots 50 in the upper rim of the coil support tube (see FIG. 4). The three pins and the three slots are spaced uniformly about the axis of the associated tube.

Figure 10:
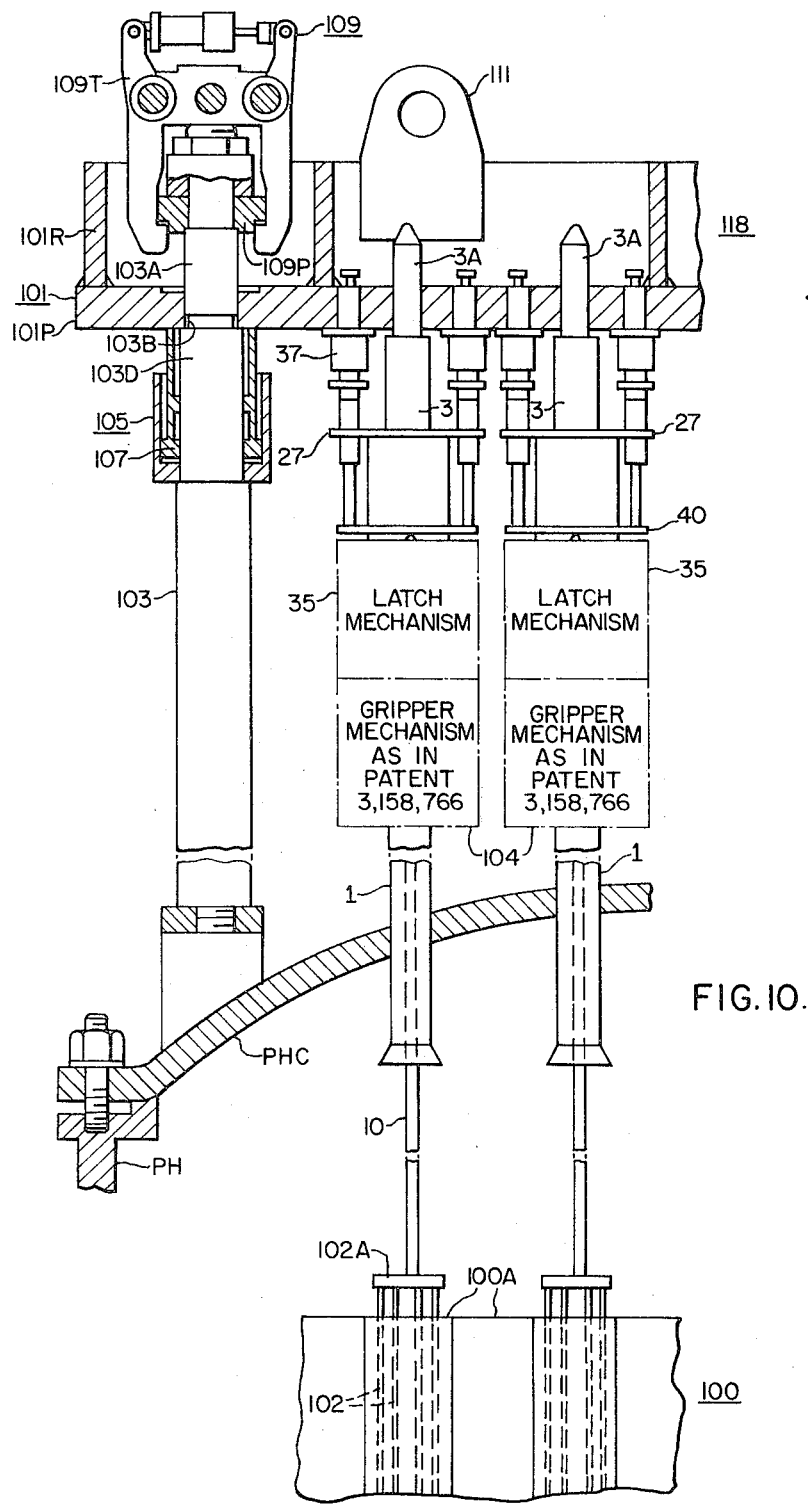
FIG. 10 is a view partly in side elevation with parts shown in section and parts broken away showing the application of the invention to a nuclear reactor.

As previously pointed out the invention is particularly suitable for nuclear reactors. In FIG. 10 a nuclear reactor is represented by a nuclear core 100 consisting of a considerable number of individual fuel assemblies 100A, and having control rods 102 which are retractable from the core for controlling the fuel in the core. The fuel assemblies have elongated vertical openings for receiving the neutron-absorbing control rods. The control rods associated with one fuel assembly, are attached by a spider 102A to an operating drive shaft 10 as also shown in FIG. 1. Each drive shaft 10 is raised and lowered by suitable mechanisms. For present purposes it will be assumed that gripper mechanism 104 is similar to that shown in U.S. Pat. No. 3,158,766 is employed for moving drive shafts 10. In this assumed arrangement the portion of the drive shaft 10 shown in FIG. 1 corresponds to an extension of the upper end of the lead screw 62 of the patent. The travel housing 1 of FIG. 1 corresponds to an upper extension of the housing 10 of the patent. With this construction the drive shaft is moved in small increments or steps as shown in the patent.

The nuclear core 100 is located within a conventional pressure housing PH having a detachable closure head PHC through which the travel housings 1 extend in sealed relationship.

In FIG. 10 the actuator buttons 37 are attached to a heavy missile shield assembly 101 which restrains or intercepts the control rod drive mechanism in the event of a major break, and which prevents damage to the mechanism during a seismic disturbance.

The missile shield assembly is arranged for vertical movement. The tips 3A are slidably received in holes in the missile shield to provide lateral support for the gripper type linear motion devices with the rod travel housing extensions.

When the missile shield assembly is retracted upwardly, it carries with it the spring-loaded buttons 37. This movement of the buttons 37 permits the springs 31 FIG. 1) to expand, thus moving the permanent magnets 22 into magnetic-coupling relationship to the latches 4. The resulting magnetic forces assure retention of the control rod drive shaft in the fully withdrawn position.

The missile shield assembly 101 includes a heavy circular plate 101P reinforced by deep vertical ribs 101R welded or otherwise secured to the plate.

The missile shield assembly is supported on four equally spaced rods 103 only one of which is shown. The rods are suitably secured to the closure head PHD of the reactor. The upper end 103A of each rod is reduced in diameter and is slidably received within a hole in the plate 101P. During normal reactor operation the plate 101P rests on a shoulder 103B for each rod.

Raising of the shield assembly is effected in any suitable manner as by an hydraulic cylinder 105 for each rod 103. An annular piston 107 is located between the inner wall of the hydraulic cylinder 105 and a reduced-diameter portion 103D of the rod 103. When fluid under pressure is applied under the annular pistons the shield assembly is hydralically raised.

The rods 103 are provided with a suitable latching mechanism 109 for latching the shield assembly in raised or lowered position. The latching mechanism 109 is represented by toggle arms 109T secured to the missile shield and engaging a lock plate 109P secured to the rod 103. When the missile shield is to be lifted the toggle arms are separated to clear the lock plate and the missile shield is then lifted. The toggle arms them may be returned to the original position above the lock plate to prevent accidental lowering of the missile shield. A crane or rig (not shown) may be connected to lugs 111 (one being shown) attached to the missile shield assembly for lifting it together with the parts secured or latched to the assembly.

Let it be assumed that a pressurized water nuclear reactor is represented by the core 100 and is to be refueled. Before starting the refueling operation a neutron-absorbing material such as boric acid is dispersed throughout the usual coolant in sufficient quantity to prevent the reactor from going critical at room temperature with all control rods completely withdrawn. The gripper mechanisms 104 for the control rod drive shafts are actuated to raise incrementally the drive shafts with the attached control rods until the tips 8 (FIG. 1) of the latches are received in the grooves 9 of the drive shafts. The gripper mechanisms are effective as shown in U.S. Pat. No. 3,158,766 to move the control rods from a first extreme position fully inserted in the core to a second extreme position completely above the core or to various intermediate positions. The latches 109 (FIG. 10) are actuated to permit raising of the missile shield assembly.

The missile shield assembly 101 is raised hydraulically by the pistons 107. This raises the buttons 37 to release the springs 31 (FIG. 1) which force the permanent magnets 22 into positions such that they are closely coupled magnetically to the latches 4 by magnetic paths having very low magnetic reluctance. Under such circumstances the magnetic forces acting on the latches 4 positively prevent dropping of the control rods. The latches 109 are returned to the original position to prevent accidental lowering of the missile shield.

A crane or rig may be coupled to the lugs 111 for the purpose of raising and moving sideways the missle shield assembly and attached parts including reactor closure head, control rod mechanisms, and upper internals with the stored control rods and drive shafts to give access to the core 100 for refueling operations.

After completion of the refueling, a reversal of the series of steps for exposing the core is followed to restore the nuclear reactor for further operation.

Figure 6:
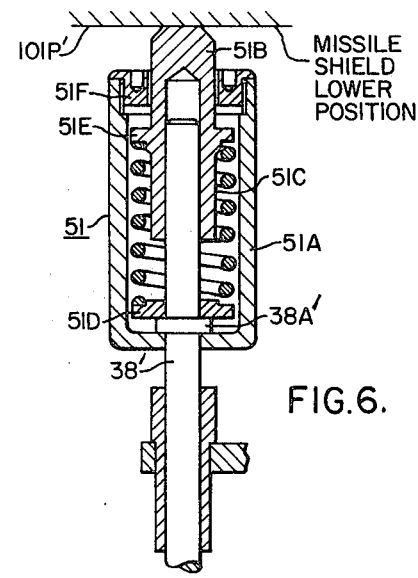
FIG. 6 is a detail view in section showing a modified form of a push rod which may replace a push rod shown in FIG. 1.

In accordance with the above description, the movement of the permanent magnets is controlled by spring-loaded buttons 37 mounted on the underside of the missile shield. This design requires considerable machining of the heavy missile shield and becomes guide expensive. A considerable cost reduction is possible by an alternate design as illustrated in FIG. 6. In accordance with this design, each spring loaded button 37 is replaced by a spring-loaded button assembly 51 mounted at the upper end of a push rod 38' which replaces the push rod 38 of FIG. 1. The button assemblies perform otherwise the same function as the missile shield mounted buttons. The button assemblies 51 now contact directly the underside of the missile shield plate 101P which, consequently, requires no special machining for this service.

The missile shield plate 101P' of FIG. 6 corresponds to the plate 101P of FIG. 10 except that it has no holes for receiving the actuator buttons 37. The push rod 38' has a flange 38A' which limits upward movement of a spring cup 51A which has a hole for slidably passing the lower end of the push rod. The upper end of the push rod 38' is sildably received in a button 51B which is positioned to engage the bottom of the plate 101P' when the plate is in its lower position. A coil spring 51C is compressed between a washer 51D which rests on the flange 38A' and a flange 51E. The head of the button 51B passes slidably through a hole in a cap 51F which is in screw-threaded engagement with the cup 51A to close the open end of the cup.

Figure 8:
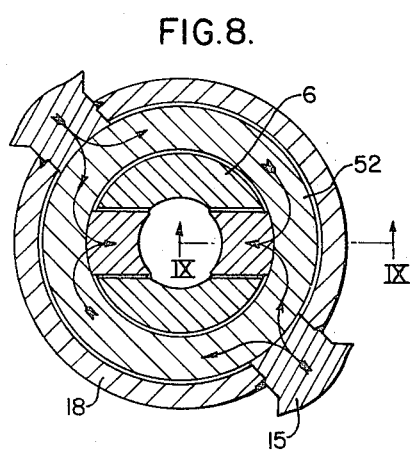
FIG. 8 is a sectional view taken on the line VIII—VIII of FIG. 7.
Figure 7:
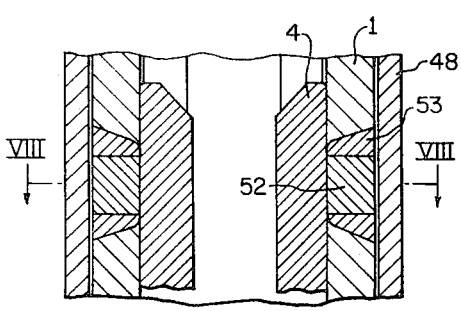
FIG. 7 is a detail view in section showing a modified form of the invention.
Figure 9:
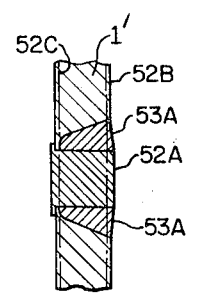
FIG. 9 is a sectional view taken on the line IX—IX of FIG. 8 but at a prior stage of fabrication.

In the design of FIG. 1, the magnetic flux to the magnet latches (4) is conducted through the non-magnetic rod travel housing 1 by magnetic plugs 20. This requires that the travel housings be rotationally aligned relative to the vessel closure head. However, this design adds to the cost of the mechanism and it would be desirable to modify the design to avoid the necessity for rotational alignment. Such a design is illustrated in FIGS. 7–9 in which the upper and lower magnetic plugs 20 in the rod travel housing wall have been replaced by upper and lower rings 52 of soft magnetic steel attached by welding 53 with non-magnetic material. A procedure for producing the joints is indicated in FIG. 9. As shown in FIG. 9 the wall of the housing 1' is thicker initially than required for the housing 1 and a ring 52A is employed which extends beyond the inner and outer surfaces of the tubular housing 1'. The soft magnetic ring 52A is then welded to the housing 1 by non-magnetic material 53A. The resultant structure is then machined to remove material within the cylindrical surface represented by the line 52C and outside the cylindrical surface represented by the line 52B. A cross section of the travel housing (FIG. 8) through the magnetic ring illustrates the freedom from rotational alignment of the travel housing 1, latch bushing 6 and magnet support tubing 18. As a result, alignment pins 27 and 25 can, with the corresponding keyways, be omitted to further reduce the cost of manufacture.

We claim:

1. In a nuclear reactor of the type designed for rapid refueling comprising: a closed pressure vessel, a plurality of upstanding elongated fuel assemblies containing nuclear fuel located in said vessel, at least some of said fuel assemblies including elongated openings extending longitudinally therethrough, a plurality of elongated movable neutron-absorbing control rod means positioned in said openings respectively for movement into and out of said some fuel assemblies, a plurality of control rod drive mechanisms supported on said vessel and each including drive means secured to each of said control rods, respectively, each of said mechanisms including operating means for individually and incrementally moving said associated drive means and associated control rod means to a plurality of holding positions between first and second extreme positions, said first extreme position being with said associated control rod means fully inserted in its associated fuel assembly, said second extreme position being with said associated control rod means being fully withdrawn from said associated fuel assembly, latching means in each of said mechanisms which mechanically engages the drive means only when said associated control rod means is in said second extreme position to hold said control rod means in said withdrawn position, actuating means mounted on each mechanism, one for each of said latching means for selectively actuating each of said latching means into engagement with said associated drive means; and selectively operable movable means mounted on each of said mechanisms, said movable means being coupled with said actuating means to permit movement of said actuating means longitudinally of said mechanism and into a position to actuate said latching means into engagment with said drive means, thereby holding said drive means and attached control rod means in said withdrawn position during the time the reactor is being refueled.

2. A nuclear reactor as claimed in claim 1 wherein said vessel includes a base portion and a releasable closure head for the base portion, a tubular housing for each of said drive mechanisms, each of said tubular housings extending along a vertical axis in sealed relationship through the closure head, said operating means for each of said drive mechanisms including gripper means within the associated housing operable for releasably gripping the associated drive means to incrementally move the associated drive means in repeated steps in a vertical path, and said latching means comprises a pair of pivotally mounted levers in said housing above said gripper means, each of said drive means having grooves in its periphery to receive the body portion of said levers when the ends thereof engage the drive means, said actuating means including permanent magnets movably mounted on each housing, each of said tubular housings having magnetic parts forming a path of low magnetic reluctance between the permanent magnets and the magnetic levers when the magnets are moved to a position opposite the body portion of the levers in said grooves.

3. The nuclear reactor according to claim 1 wherein said actuating means comprises a magnetic device mounted on said mechanism opposite from the latching means, whereby the magnetic device acts to move the latching means by magnetic attraction into engagement with the drive means.

4. The nuclear reactor according to claim 1 wherein each of the latching means comprises at least one lever in the mechanism selectively movable by said actuating means into engagement with the drive means to hold the drive means and its connected control rod means in the second extreme position.

5. The nuclear reactor according to claim 4 wherein each actuating means comprises at least one permanent magnet movably mounted in a housing on said mechanism, and means associated with said permanent magnet for holding it in a lower position out of flux linking relationship with said lever and for moving it to an upper position wherein the lever is actuated by magnetic attraction into engagement with the drive means.

6. The nuclear reactor according to claim 1 wherein each latching means comprises a pair of levers movably mounted in said mechanism;
   spring means between said levers for biasing one end of each lever into engagement with the drive means;
   means on said end of each lever having a configuration complementary to a portion of the drive means for facilitating the holding of the drive means in the second extreme position; and wherein
   said actuating means comprises a pair of permanent magnets respectively mounted on each mechanism opposite from each lever and movable between a lower position where the levers lie outside the permanent magnet field and an upper position where the lever ends are moved by magnetic attraction into engagement with the drive means thereby precluding movement of the drive means and attached control rod means into their respective fuel assemblies.

7. The nuclear reactor according to claim 6 wherein displaceable means are coupled to said permanent magnets for selectively moving said magnets between said lower and upper positions.

8. The nuclear reactor according to claim 7 wherein said permanent magnets are movably mounted in housings on each mechanism; and
   spaced sections of magnetic material in the walls of said mechanism directly opposite from said levers and from the permanent magnets when located in the upper position thereby establishing a low reluctance path from the magnets through the magnetic material and levers.

9. The nuclear reactor according to claim 7 wherein said displaceable means comprises a displaceable missile shield surmounting said pressure vessel;
   a movable coupling device on each mechanism;
   an actuator rod interconnecting each of said permanent magnets with each coupling device; and
   spring means on each rod which urges each permanent magnet into said upper position, the arrangement being such that when the missile shield is displaced downwardly, each magnet is held in said lower position and when the missile shield is displaced upwardly, the spring means acts to move said magnets from the lower to the upper position and therefore into alignment with the magnetic material on its mechanism.

10. The nuclear reactor according to claim 1 wherein the drive means moves linearly in a bushing in each mechanism; and wherein
   said latching means comprises a pair of oppositely disposed levers pivoted on said bushing, each of said levers having an end engageable with a complementary surface on the drive means to hold the drive means in said mechanism, each of said levers further having a body portion extending from said ends in a direction upwardly in said bushing;
   shock absorbing means interconnecting said bushing with a stationary section of said mechanism;
   whereby after the actuating means moves the levers into engagement with the drive means, said shock absorbing means will contain any shock imposed on said bushing in the event the drive means and attached control rod means inadvertently drops in a direction toward the fuel assembly.

* * * * *